2 Sheets—Sheet 1.

J. D. WILBER.
Mower.

No. 211,122. Patented Jan. 7, 1879.

Witnesses
Harry King
D. P. Cowl

Inventor
John D. Wilber
By Wm. A. Sutphin
Atty

J. D. WILBER.
Mower.
No. 211,122. Patented Jan. 7, 1879.
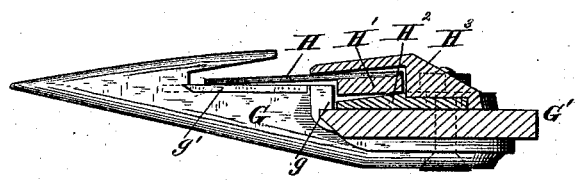
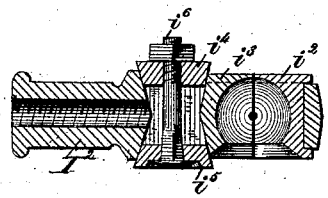
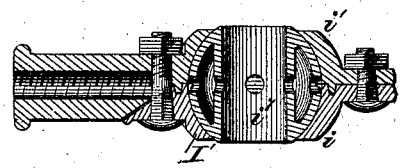
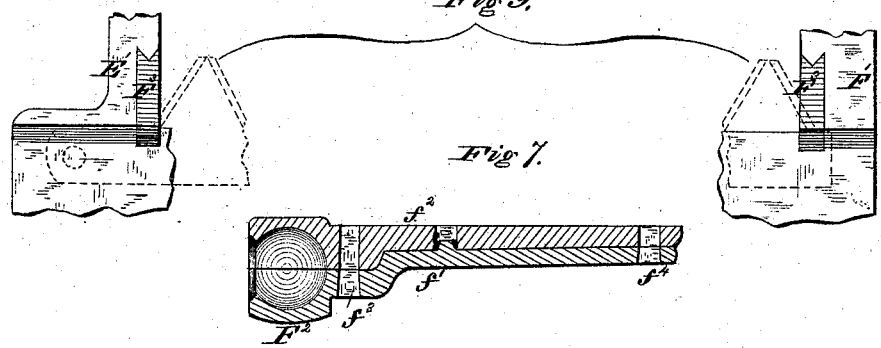
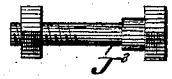

UNITED STATES PATENT OFFICE.

JOHN D. WILBER, OF TOWANDA, PENNSYLVANIA, ASSIGNOR TO JOHN C. MARSHALL, OF SALT POINT, NEW YORK.

IMPROVEMENT IN MOWERS.

Specification forming part of Letters Patent No. 211,122, dated January 7, 1879; application filed December 29, 1877.

*To all whom it may concern:*

Be it known that I, JOHN D. WILBER, of Towanda, Bradford county, and State of Pennsylvania, have invented a new and useful Improvement in Mowing-Machines, of which the following is a specification:

The invention relates to improvements on my former patents, numbered 101,554, 120,407, and 142,828.

Figure 1:
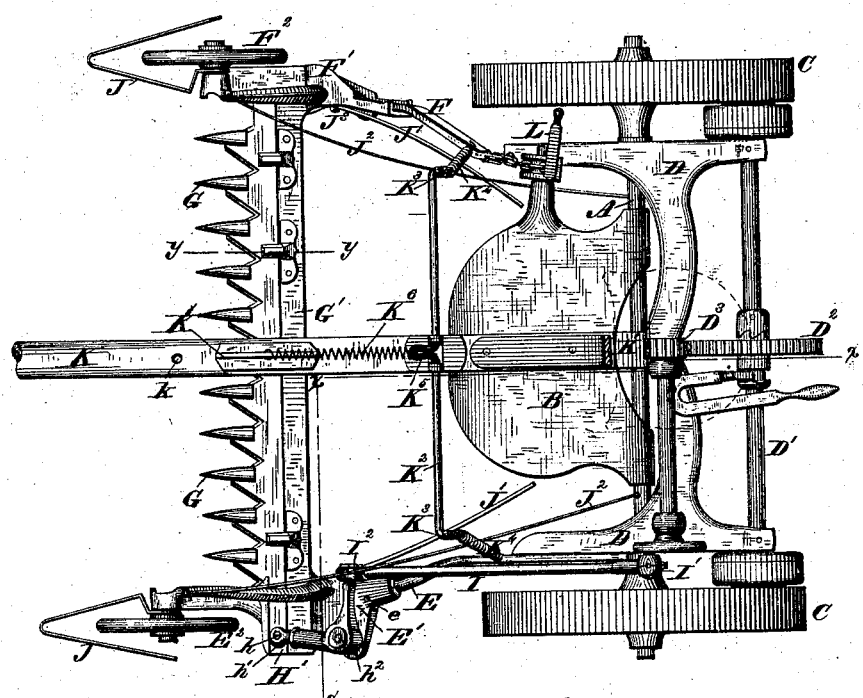
Figure 2:
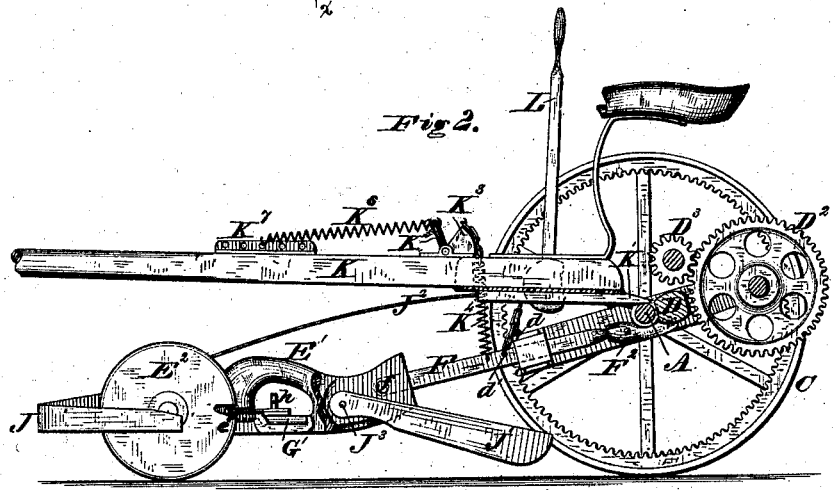
Figure 3:
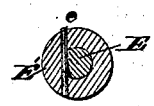

In the accompanying drawings, Figure 1 represents a plan or top view of my improved machine with the driver's seat removed, but its location indicated by dotted lines; Fig. 2, an elevation, partly in section, on the line $x\,x$ of Fig. 1, with the sliding arm of the bell-crank lever removed from the pin secured to the sickle-bar; Fig. 3, a cross-section through the socketed heel of the left-hand shoe, showing the pin which secures the arm in the socket; Fig. 4, a section through the finger-bar and sickle-back, on the line $y\,y$, Fig. 1; Figs. 5 and 6, longitudinal sections through the upper and lower ball-sockets of the pitman-heads; Fig. 7, a longitudinal section through the ball-socket of the upper end of the right side arm; Fig. 8, a bolt on which the track-clearers or deflectors pivot; and Fig. 9, sections of the two shoes, showing the construction of the reversible or interchangeable steel ledger-plates.

The axle A, to which the platform B is rigidly secured, is supported by the driving-wheels C. On the axle A is pivoted the frame D, which supports the driving-gearing and the cutting apparatus. The wheels C turn loosely on the axle, and to give driving-power to the gearing the said wheels are provided with internal gearing, which gives rotation to the counter-shaft $D^1$ through the usual pinions and backing-ratchets. On the shaft $D^1$ is loosely applied the spur-wheel $D^2$, which may be caused to rotate with the shaft by a ratchet-connection, at the pleasure of the attendant. The wheel $D^2$ gears with the pinion $D^3$ on the crank-shaft, thus, when the mechanism is in gear, giving rotation to the crank-shaft.

The cutting apparatus is attached to the frame D by loosely-jointed arms E F. The lower end of the arm F is attached to the heel of the shoe $F^1$ by a pivot-pin, $f$, the shoe being provided with a recess, the upper and lower flanges of which form stops to limit the up-and-down movement of the shoe on the arm. The upper end of said arm is attached to the frame D by being provided with a ball, which is held in a socket-bearing, $F^2$. Said bearing is bolted to the frame at or near the main axle, so that the thrust of said arm is from the axle of the machine on which the frame D pivots.

The socket-bearing $F^2$ is made in two longitudinal sections, $f^1\,f^2$. To insure the coincidence of parts the section $f^2$ is provided with a socket or aperture, and the section $f^1$ is furnished with a pin or lug to enter the socket in the former. To secure these parts together the bolts which attach the socket-bearings to the frame D are passed through the apertures $f^3\,f^4$ in said bearing.

The arm E is rigidly secured to the frame D at its upper end, and its lower end is made round, and enters a corresponding socket in the rear end of the shoe $E^1$. To secure together the arm E and shoe $E^1$, and still allow a rolling movement of the shoe on the arm, I provide the end of the arm with a groove partly around its circumference, into which a pin, $e$, is inserted as it is passed through the socket in the shoe. The front ends of the shoes $E^1\,F^1$ are supported on lead-wheels $E^2\,F^2$, the journals of which are vertically adjustable in the shoes, so as to adjust the cutting apparatus higher or lower. To avoid the twisting strain on the joints of the shoe $F^1$ and arm F, I journal the lead-wheel $F^2$ at or near the line of the cut of the sickle, thus balancing its weight. The lead-wheel $F^2$ is also journaled, so that it overlaps the line of the points of the cutters; and to provide a means of removing the cutter without removing the lead-wheel, I provide the wheel with a V-shaped notch or opening, $e'$, in the periphery, through which the cutter is drawn as it is removed from its seat in the finger-bar.

To strengthen the guard-fingers G to resist undue thrust downward, I provide a shoulder, $g$, which overlaps the front edge of the finger-bar $G'$. I also give additional strength to the guard by beveling the ledger-blade $g'$ at its front end backward and downward from its upper edge, thus removing the weakest part, the sharp angle of the recess holding the ledger-blade to its farthest upward point from the supporting part of the guard.

To give a close shear-cut between the cutter H and ledger-blade $g'$, I raise the rear of the knife-section or knife-bar $H^1$, so as to throw the point of the knife down in close contact with the ledger-blade, and as the knife is reciprocated the cutting-edges of the knife and blade will always be in contact. To secure this result I provide tapering steel supporting-blocks $H^2$ for the sickle-bar, and make them of a thickness sufficient to raise the heel of the knife slightly above the cutting-face of the guard. The points or front ends of these blocks are made thinner than the rear, or the point where the rear of the sickle-bar rests. The blocks $H^2$ are secured in place by being extended to the rear sufficiently to be clamped by the holder $H^3$, which is provided with a recess for that purpose. The holder $H^3$ is also provided with an arm extending forward and projecting downward, so as to bear upon the knives in front of the sickle-bar, and thus insure the constant contact of the cutting-edges of the knives and ledger-blades. The shoes $E^1$ $F^1$ are each provided with cutting-plates or ledger-blades $F^3$, these shoes being also provided with a recess on their inner sides, into which said plates are secured. The plates $F^3$ are made of a straight piece of steel, with a V or notch in their front ends to retain them in position in the shoe, and the rear ends thereof are bent downward and secured under the finger-bar, as represented in Fig. 9, and by dotted lines in Fig. 2.

By the construction of these plates they are interchangeable; and as both sides of the plates have cutting-edges, they may be used in either shoe, or changed from one to the other as the edge next to the cutter may wear away.

The cutter-bar, at its inner or left-hand end, is provided with a rigid pin, $h$, on which the sliding arm $h^1$ of the bell-crank lever $h^2$ is pivoted. Motion is communicated to the cutter by the pitman I, which is connected at its upper end to the crank-wheel, and at its lower end to the bell-crank lever $h^2$.

The upper pitman-head, $I^1$, is composed of two sections, $i$ $i^1$, formed, respectively, with a concentric recess and projection fitting into each other, and with a socket to receive the ball-bearing $i^7$, in which the wrist-pin is journaled, said ball-bearing being also provided with recesses and apertures for the purpose of lubricating the wrist-pin and socket-bearing. The ball-bearing is secured in the pitman-head by bolting the sections $i$ $i^1$ together.

The lower pitman-head, $I^2$, is in the form of a yoke, which receives the blocks $i^2$ $i^3$. Between these blocks is formed a socket-bearing to receive the end of the bell-crank, and said blocks are secured in place by the wedge-blocks $i^4$ $i^5$, which are forced in between the block $i^3$ and the shoulder of the pitman-head.

The dividers or guard-deflectors J are attached to the journals of the lead-wheels, and serve to divide the standing grain and direct that within the tread of the wheels to the cutters, and to deflect that outside of the wheels away from contact with said wheels. By attaching the dividers to the journals of the lead-wheels the relation of the divider to the wheel always remains the same whatever adjustment may be made of the cutting apparatus.

The guards are necessary on both the lead-wheels, because the machine cuts back and forth on the same side of the standing grain, which causes each side of the machine alternately to act as the divider.

To direct the cut grass clear of the driving-wheels, I provide the track-clearers $J^1$, which are pivoted to the rear of the shoes by a bolt, $J^3$, Fig. 8, the body of which is enlarged near the head, so that the enlargement will form a shoulder, between which and the nut it may be rigidly set in the shoe, and the track-clearer be loosely pivoted on the enlargement and confined between the shoe and head of the bolt, and have a free up-and-down movement, except as its downward movement is arrested by a lug on the shoe.

The guards or deflectors $J^2$, at their front ends, enter holes or recesses in the front of the shoe or lead-wheel support, and the rear ends are received in holes in the main axle, the spring of these rods being sufficient to retain them in position.

The draft-pole K is rigidly connected to the platform B; and to prevent the settling of said platform in the center, due to the weight of the driver, whose seat is located on the pole, I provide an extension, $K^1$, of the pole to rest on the axle.

For the purpose of counterbalancing the weight of the cutting apparatus, I place a bar, $K^2$, across the pole, just in front of the platform, its ends extending to or near the side arms of the main frame, and having a suitable journal-support on said pole. The ends of this bar may be provided with segmental bearings $K^3$, each having a hook at its upper corner, and to the side arms, E F, are attached lifting-springs $K^4$, to the upper ends of which are attached a few links of chain, for convenience in adjusting the springs on the segments, by engaging either of the links on the hooks, to give more or less tension or lifting-power to the springs. To increase the flexibility of the counter-balance, I provide the bar $K^2$ with a crank arm, $K^5$, at its center, to which the spring $K^6$ is attached, the opposite end of said spring being adjustably connected to the pole by hooking in either one of a series of holes in the flange $K^7$, which is rigidly secured to the pole.

The double-tree is applied to the pole at $k$, in the usual way.

The hand-lever L, for adjusting the frame of the machine and lifting the cutting apparatus, is journaled on the platform within convenient reach of the driver in his seat on the machine. Said lever is provided with the usual segment and lifting-chain; but the lower end of said chain has two points of attachment—one to the frame D, at $d$, and one to the side arm, F, at $d'$—the object of this double attachment being to allow a free independent movement of the jointed side arm, F, and frame D, and at the same time the ability to raise both frame and jointed side arm.

What I claim is—

1. The supporting-blocks $H^2$, tapering from the rear of the knife-bar to their front ends, in combination with the cutter-bar resting upon them at the rear ends only, substantially as described.

2. The combination of the supporting-blocks $H^2$ and sickle-bar $H^1$, of a combined thickness a little greater than the depth of the shoulder $g$, so that the heel of the knife is raised slightly above the cutting-face of the guard-finger, and the point thereof thrown down in close contact with the ledger-blade, substantially as described.

3. The combination of the tapering supporting-blocks, the knife-bar, resting upon them at their rear ends only, and the holder, substantially as described.

4. The lead-wheel provided with the notch in its periphery, through which the sickle is drawn to remove it from the finger-bar, substantially as described.

5. The divider J, secured to or supported by the journal of the lead-wheel, so that as the cutting apparatus is adjusted up or down the relation of the divider and lead-wheel will remain unchanged, substantially as described.

6. The combination of the cutting apparatus, the lead-wheels $E^2$ $F^2$, and the dividers J J, secured to or supported by the journals thereof, substantially as described.

7. The pitman-head I, composed of the sections $i$ $i^1$, formed respectively with concentric recess and projection fitting into each other, and forming a socket to receive the ball-bearing $i^7$, substantially as described.

8. The combination of the pitman-head $I^2$, forming a loop-holder, blocks $i^2$ $i^3$, wedges $i^4$ $i^5$, and bolt $i^6$, substantially as described.

9. The arm F, attached to the main frame by a socket-bearing, $F^2$, composed of sections $f^2$ $f^3$, provided, respectively, with a lug and recess fitting into each other, and secured together by the bolts which secure the bearing to the main frame, substantially as described.

10. The pole attached to the axle, substantially as described, and provided with extension $K^1$, resting upon the axle, substantially as described.

11. The combination of the independently-vibrating side arms E, F, spring-supports $K^4$ $K^4$, and bar $K^2$, substantially as described.

12. The combination of the side arms, E F, spring-supports $K^4$ $K^4$, cranked bar $K^2$, and spring $K^6$, substantially as described.

JOHN D. WILBER.

Witnesses:
 JOHN WILBER,
 LEWIS N. ALLENDORF.